(12) United States Patent
Caporal et al.

(10) Patent No.: US 10,248,305 B2
(45) Date of Patent: Apr. 2, 2019

(54) MANIPULATING DOCUMENTS IN TOUCH SCREEN FILE MANAGEMENT APPLICATIONS

(71) Applicant: AirWatch LLC, Atlanta, GA (US)

(72) Inventors: Colleen Caporal, Atlanta, GA (US); Muhammad Abeer, Roswell, GA (US)

(73) Assignee: AirWatch LLC, Atlanta, GA (US)

( * ) Notice: Subject to any disclaimer, the term of this patent is extended or adjusted under 35 U.S.C. 154(b) by 304 days.

(21) Appl. No.: 14/741,925

(22) Filed: Jun. 17, 2015

(65) Prior Publication Data

US 2016/0070432 A1 Mar. 10, 2016

Related U.S. Application Data

(60) Provisional application No. 62/046,938, filed on Sep. 6, 2014.

(51) Int. Cl.

| | |
|---|---|
| *G06F 3/0488* | (2013.01) |
| *G06F 17/30* | (2006.01) |
| *G06F 3/0481* | (2013.01) |
| *G06F 3/0482* | (2013.01) |
| *G06F 3/0484* | (2013.01) |
| *H04L 29/06* | (2006.01) |
| *G06F 21/62* | (2013.01) |

(52) U.S. Cl.
CPC ......... *G06F 3/0488* (2013.01); *G06F 3/0482* (2013.01); *G06F 3/04817* (2013.01); *G06F 3/04842* (2013.01); *G06F 3/04845* (2013.01); *G06F 17/30176* (2013.01); *G06F 21/62* (2013.01); *G06F 21/6218* (2013.01); *H04L 63/20* (2013.01); *H04L 65/403* (2013.01); *H04L 63/105* (2013.01)

(58) Field of Classification Search
CPC .................................................. G06F 3/0488
See application file for complete search history.

(56) References Cited

U.S. PATENT DOCUMENTS

| | | | |
|---|---|---|---|
| 5,929,854 A | * | 7/1999 | Ross ..................... G06F 3/0481 715/783 |
| 6,745,245 B1 | | 6/2004 | Carpenter |
| 8,239,880 B1 | | 8/2012 | Caccavale |
| 9,240,962 B2 | | 1/2016 | Jung |

(Continued)

OTHER PUBLICATIONS

Office Action dated Dec. 28, 2016 for U.S. Appl. No. 14/740,683.

(Continued)

*Primary Examiner* — Roland J Casillas
(74) *Attorney, Agent, or Firm* — Thomas | Horstemeyer, LLP

(57) ABSTRACT

Disclosed are examples of manipulating documents in file management applications. In one example, a listing of at least one file can be encoded in a user interface of a client application for rendering in a touch screen display. A touch input can be received that designates a selected one of the files, where the touch input can be a gesture performed on the touch screen display. In response to a type of the gesture matching a predefined gesture type, a determination can be made whether at least one of the files is active in the client application and the user interface can be modified to include the at least one of the files and the selected one of the files in response to the at least one of the files.

20 Claims, 16 Drawing Sheets

(56) References Cited

U.S. PATENT DOCUMENTS

| | | | |
|---|---|---|---|
| 9,405,821 | B1 | 8/2016 | Bessis |
| 9,891,810 | B2 | 2/2018 | Caporal |
| 2007/0203917 | A1 | 8/2007 | Du et al. |
| 2007/0209022 | A1* | 9/2007 | Gourdol .................. G06F 9/451 |
| | | | 715/815 |
| 2013/0083069 | A1* | 4/2013 | Yakishyn .............. G06F 3/0488 |
| | | | 345/634 |
| 2013/0198304 | A1 | 8/2013 | Jung |
| 2013/0201107 | A1* | 8/2013 | Rossi .................... G06F 3/0488 |
| | | | 345/163 |
| 2013/0239003 | A1 | 9/2013 | Usenko |
| 2013/0332916 | A1 | 12/2013 | Chinn et al. |
| 2014/0165176 | A1 | 6/2014 | Ow |
| 2014/0193136 | A1 | 7/2014 | Nishizawa |
| 2014/0289225 | A1 | 9/2014 | Chan |
| 2014/0344739 | A1 | 11/2014 | Yoon |
| 2015/0081636 | A1 | 3/2015 | Schindler et al. |
| 2015/0178516 | A1 | 6/2015 | Mityagin |
| 2015/0205464 | A1 | 7/2015 | Kozlowski et al. |
| 2018/0011627 | A1 | 1/2018 | Siracusano, Jr. |

OTHER PUBLICATIONS

Office Action dated Apr. 21, 2017 for U.S. Appl. No. 14/740,683.
Notice of Allowance dated Sep. 26, 2017 for U.S. Appl. No. 14/740,683.
Office Action dated Nov. 29, 2017 for U.S. Appl. No. 14/739,204.
Office Action dated Apr. 27, 2018 for U.S. Appl. No. 14/741,068.
Office Action dated May 3, 2018 for U.S. Appl. No. 15/893,966.
Office Action mailed for U.S. Appl. No. 14/739,204.

* cited by examiner

MANIPULATING DOCUMENTS IN TOUCH SCREEN FILE MANAGEMENT APPLICATIONS

CROSS-REFERENCE TO RELATED APPLICATION

The present application claims the benefit of and priority to U.S. Provisional Patent Application No. 62/046,938, entitled "USER INTERFACE FUNCTIONALITY FOR PORTABLE DEVICES," filed on Sep. 6, 2014, the contents of which are hereby incorporated by reference herein in its entirety.

BACKGROUND

Accessing and opening files can be performed with ease on some devices while it can be difficult on others. For example, desktop computers traditionally have a keyboard and a mouse that allow files to be opened, altered, and viewed conformably in a large display device, such as a computer monitor. As the popularity of mobile devices increases, the ability to access, maintain, and manipulate files on mobile devices remains problematic. For example, it remains difficult to open multiple files, navigate between opened files, and edit files, given the size of displays on mobile devices.

A touch screen display can be an input device that can be positioned on the top of an electronic visual display of a device. Mobile devices commonly include a touch screen display. Instead of requiring a mouse, a keyboard, or another input device, a user can provide input through gestures by touching the screen with a stylus, finger, or other part of the hand.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
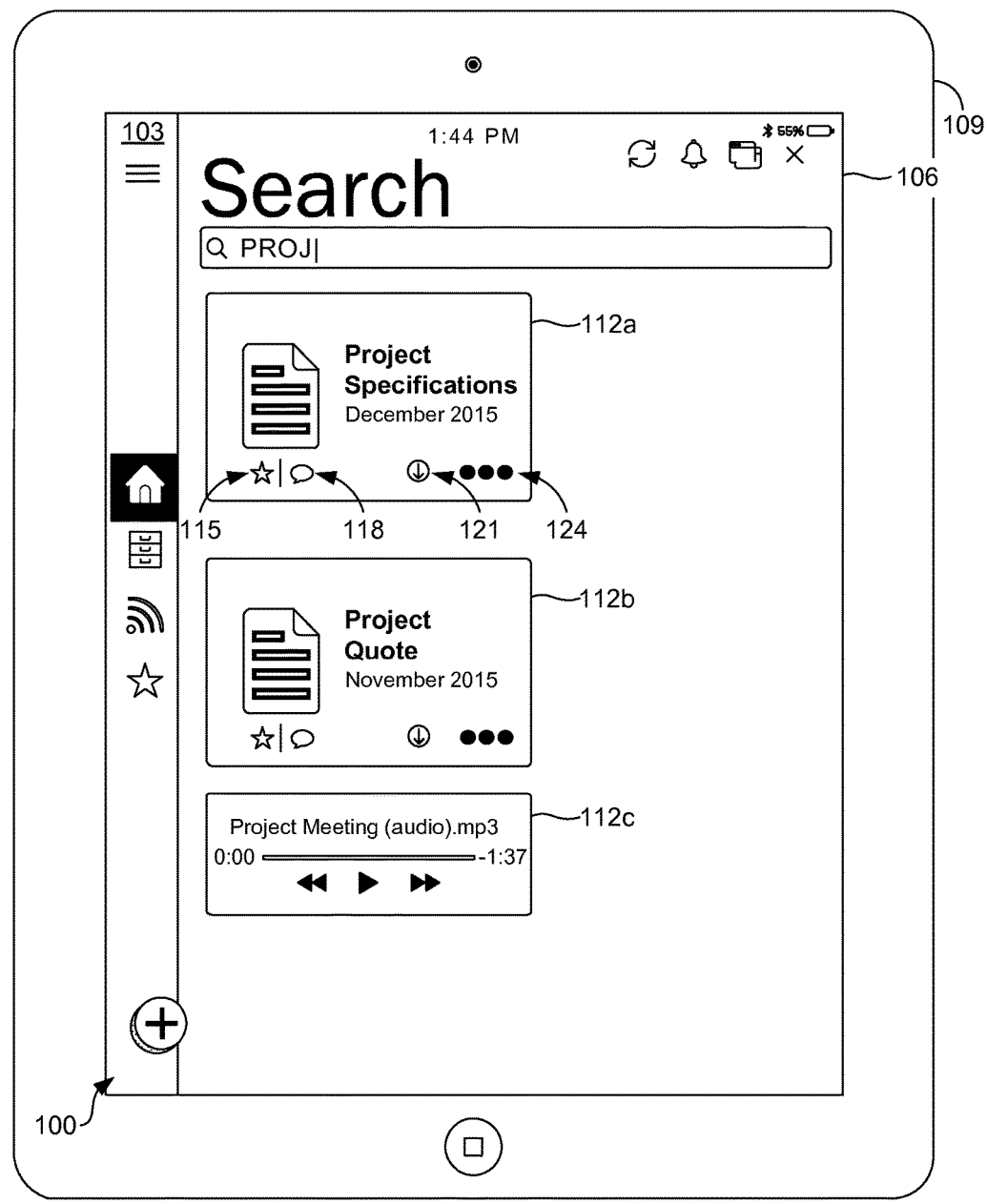
FIGS. 1A-1D are drawings of examples of user interfaces rendered on a display of a client device.

The present disclosure relates to manipulating documents in file management applications. As noted above, accessing and opening files can be performed with ease on some devices while it can be difficult on others. For example, desktop computers traditionally have a keyboard and a mouse that allow files to be opened, altered, and viewed conformably in a large display device, such as a computer monitor. As the popularity of mobile devices increases, the ability to access, maintain, and manipulate files on mobile devices remains problematic. For example, it remains difficult to open multiple files, navigate between opened files, and edit files given the size of displays on mobile devices.

It can be beneficial for a computing environment to maintain a collection of files remotely so that multiple instances of a client application can access files and other content from the computing environment using various devices. A gesture performed on a touch-screen display device can be used to causes multiple sources of content to be shown in a single user interface, thereby reducing the need to navigate multiple user interfaces of content. The sources of content can include files made accessible to the client device by the computing environment. To this end, the computing environment can encode a listing of files available for access by the client device in a user interface for rendering in a touch screen display. For example, the listing of the files can be presented in a navigation bar component, as will be described below. The client application can detect a selection of one or more of the files in the user interface, for example, by detecting a touch input performed on a touch screen display of a client device.

In some examples, the touch input can include a gesture performed on the touch screen display, such as a long press, a short press, a left swipe, a right swipe, a finger swipe, a palm swipe, or other suitable gesture. In other words, the computing environment can identify a type of the gesture performed on the touch screen display. If the gesture performed matches a type of predefined gesture, such as one established to open multiple files in a user interface, the computing environment can present multiple sources of content in a single user interface.

In some examples, the computing environment can determine whether a file is active in the client application and modify the user interface accordingly to include the active file and the file selected by the user. Additionally, in some examples, the computing environment can generate an arrangement of the files for display in the modified user interface. In some examples, the arrangement, as well as the size of the files in the arrangement, can be determined based on a number of files active in the client application or a number of files to show in the display. When multiple files are shown in a single user interface, the client application can facilitate independent manipulation of each of the files. For example, one of the files can be browsed, edited, enlarged, minimized, or zoomed while a state of another file in the user interface remains unchanged.

With reference to FIG. 1A, shown is an example of a user interface 100 of a client application 103 rendered on a display 106 of a client device 109. In the example of FIG. 1A, the client application 103 can provide users of various client devices 109 with secure access to files stored remotely by a computing environment. To this end, the client application 103 can provide employees of an enterprise with access to enterprise data, such as word processing documents, image files, video files, audio files, spreadsheets, or presentations. As the number of files available to a given user on a client device 109 can be vast, the client application 103 can facilitate searching for or navigating a multitude of files.

The computing environment can be a server computing device or a collection of server computing devices that can serve up information associated with the files or can provide the files themselves for local access on the client device 109. The file information can include file names, file modification history, and author information. The client application 103 can facilitate the viewing, navigating, editing, or other manipulation of the files locally on the client device 109. In addition, the client application 103 can facilitate an upload of locally performed revisions or modifications of the files.

Information associated with one or more files can be shown in cards 112a . . . 112c (collectively cards 112) or other suitable regions of the user interface 100. A card 112 can represent a file accessible on the client device 109 and can include information such as a filename, a file size, or a date when the file was created or last modified. The files can be accessed by selecting or manipulating a card 112. In some examples, the file can be stored remotely by a computing environment and accessed by the client application 103 by communicating the file to the client device 109 over a network. In another example, the file can be stored locally on the client device 109. The cards 112 can facilitate user interaction through a suitable input device, such as a mouse, keyboard, or touch-screen display. For example, assuming the display 106 of the client device 109 is a touch-screen display, the user can manipulate icons in the cards 112 using a gesture, such as a tap or press, to perform a task in association with a particular file. Some examples of icons include a favorite icon 115, a comment icon 118, a download icon 121, and a "more functions" icon 124.

Figure 1B:
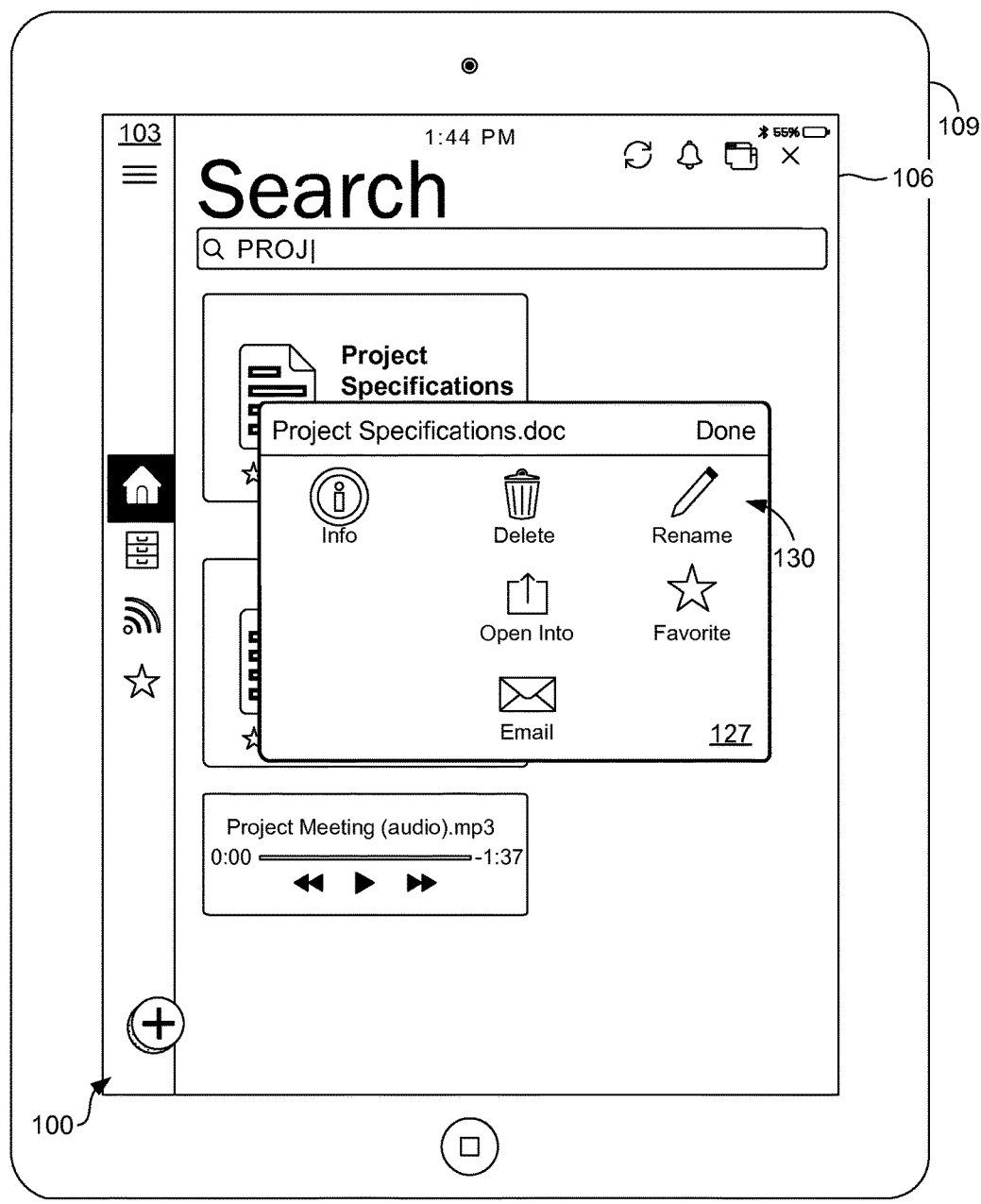

With reference to FIG. 1B, when the "more functions" icon 124 is manipulated, a dialog 127 can be shown that facilitates performance of functions potentially not included in a card 112, such as deleting the file locally from the client device 109, renaming the file, emailing the file, or opening the file into an application other than the client application 103, such as a third-party document editing application. A modification of a file performed locally on the client device 109, such as renaming the file, can modify a local version of the file or can modify both a local version of the file and a version of the file stored in the remote data store. The file can be renamed by selecting or otherwise manipulating a rename icon 130.

Figure 1C:
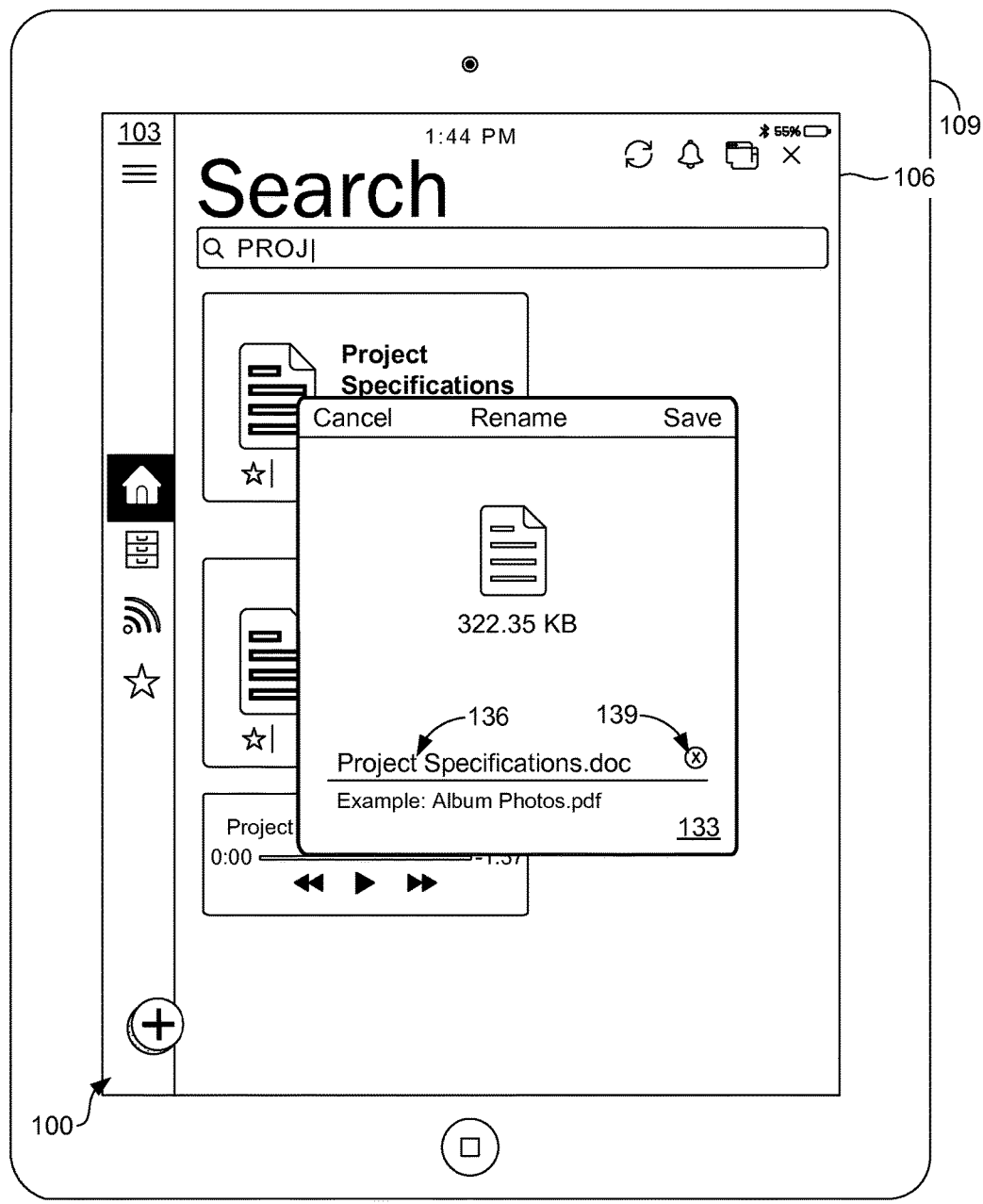

As shown in FIG. 1C, when the rename icon 130 is manipulated, the client application 103 can present a rename dialog 133 in the user interface 100 that allows a user to specify a name for a particular file. A current name for the file can be shown in a text field 136 that, when selected, can allow a user to modify the current name using a suitable input device, such as a virtual keyboard. A delete icon 139 can clear the text in the text field 136 in some examples.

Figure 1D:
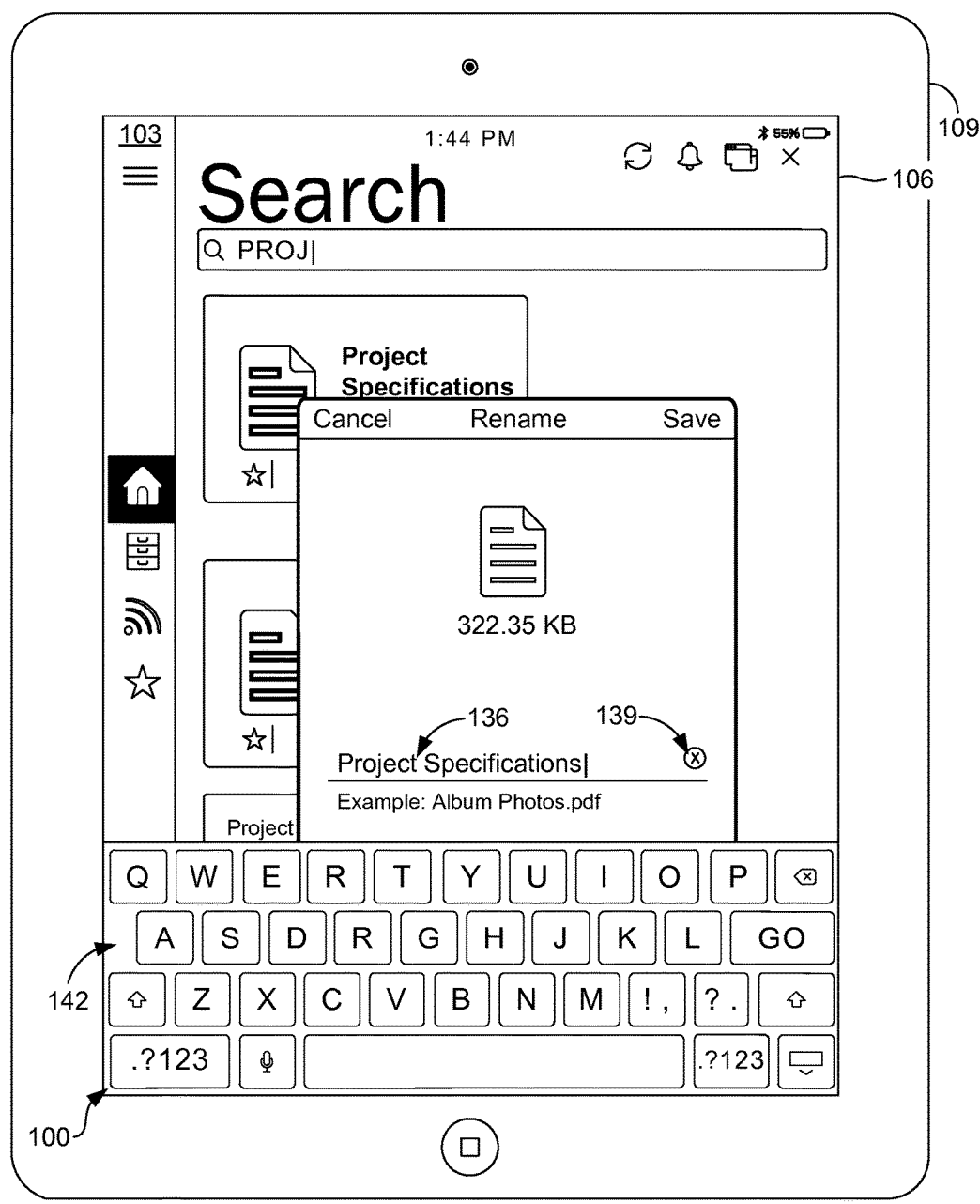

Referring next to FIG. 1D, when the text field 136 is selected, the client application 103 can present a virtual keyboard 142 in the user interface 100 that allows a user to add or remove characters to rename a particular file. Similar to FIG. 1C, the delete icon 139 can clear the text in the text field 136 in some examples. The process described in FIGS. 1A-1D can be used to rename a filename shown in a particular card 112 on a touch screen device with minimal user interaction, for example, using a touch screen display.

In some examples, when a file is renamed, a header or metadata of the file can be updated to reflect the change in the filename. The header, metadata, or the new filename can be communicated to the computing environment to update a remotely stored version of the file, without having to communicate the file itself. As a result, less data can be communicated over the network.

Figure 2:
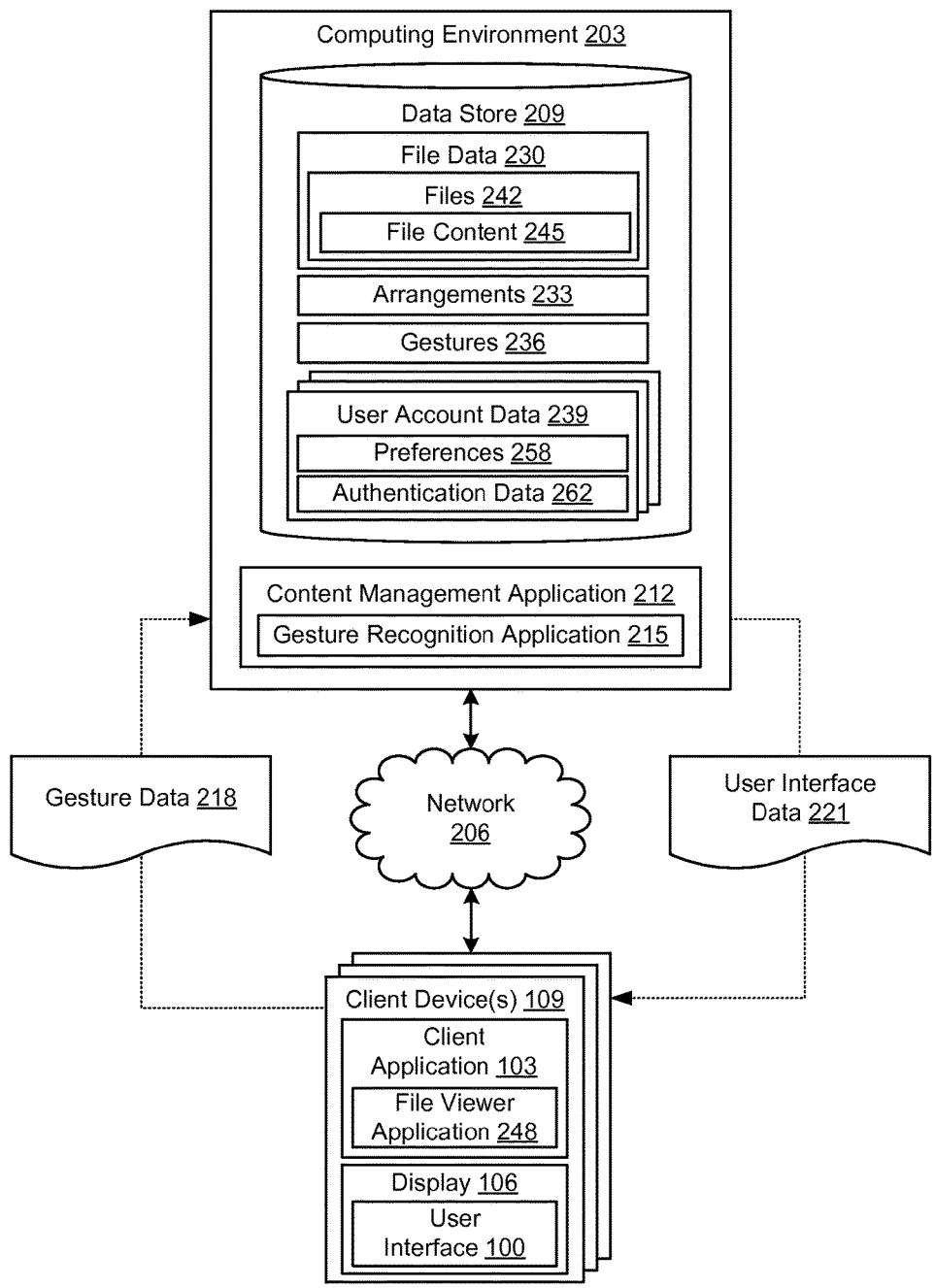
FIG. 2 is a drawing of an example of a networked environment including a device management application.

With reference to FIG. 2, shown is an example of a networked environment 200. The networked environment 200 can include a computing environment 203 and a client device 109 in communication with one other over a network 206. The network 206 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, or telephony networks.

The computing environment 203 can include, for example, a server computer or any other system providing computing capability. Alternatively, the computing environment 203 can include a plurality of computing devices that are arranged, for example, in one or more server banks or computer banks. The computing environments 203 can include a grid computing resource or any other distributed computing arrangement. The computing devices can be located in a single installation or can be distributed among many different geographical locations. The computing environments 203 can also include or be operated as one or more virtualized computer instances. For purposes of convenience, the computing environment 203 is referred to herein in the singular. Even though the computing environment 203 is referred to in the singular, it is understood that a plurality of computing environments 203 can be employed in the various arrangements as described above.

The data store 209 can include memory of the computing environment 203 or mass storage resources of the computing environment 203. The data stored in the data store 209, for example, can be associated with the operation of the various applications and functional entities described below.

The components executed on the computing environment 203 can include, for example, a content management application 212 and a gesture recognition application 215. The content management application 212 can serve up files and information associated with files to client devices 109. Information associated with files can include, for example, file names, file modification history, and author names.

The gesture recognition application 215 can remotely detect gestures performed on the client device 109. The client application 103 can provide gesture data 218, such as coordinates of a touch event, or a speed of a touch event. In response, the content management application 212 can perform a corresponding task based on the type of gesture performed. In one example, if a gesture indicates that the user desires to open multiple files concurrently in a single user interface, the content management application 212 can determine an arrangement of files to be shown in a user interface 100 and communicate the arrangement to the client application 103 as user interface data 221.

The data stored in the data store 209 can include, for example, file data 230, arrangements 233, gestures 236, and user account data 239. The file data 230 can include files 242 as well as information associated with the files 242, such as a filename, version history, modification history, file size, download history, and user permissions. Each of the files 242 includes file content 245 that can be shown to a user when the file 242 is opened using a suitable file viewer application 248.

Arrangements 233 can include size, positions, and locations of files 242 for concurrent placement in a user interface 100. In some examples, arrangements 233 can be generated dynamically by the content management application 212 based on the files 242 being shown concurrently in the user interface 100.

Gestures 236 can include touch events performed on a touch screen display of a client device 109. For example, gestures 236 can include a long press, a short press, a left swipe, a right swipe, a finger swipe, or a palm swipe. A long press can include a pressing of a finger or stylus on a user interface exceeding a predefined time threshold, and a short press can include a pressing of a finger or stylus on a user interface shorter than a predefined time threshold. A developer of the client application 103 or an administrator can specify gestures 236 that, when performed on the client device 109, cause various tasks to be performed. In one example, a long press on a file 242 can cause multiple files 242 to be shown in the user interface 100 while a short press on a file 242 can cause only the selected file 242 to be shown in the user interface 100.

User account data 239 can include information associated with one or more users, such as a username, a real name, an email address, an avatar or picture, preferences 258, and authentication data 262. Preferences 258 can include, for example, settings predefined by a user. In some examples, a user can customize an arrangement 233 of files 242 for later access. Similarly, the user can predefine gestures 236 that, when performed, cause different tasks to be performed by the content management application 212 or the client application 103. Authentication data 262 can include information used to authenticate a user of the client device 109. In some example, authentication data 262 can include a username, a password, an e-mail address, or a personal identification number (PIN), biometric data. In some examples, certain files 242 are only available to particular users. Accordingly, before a file 242 is permitted for access on a client device 109, suitable authentication can be required.

The client device 109 can be representative of one or more client devices 109. The client device 109 can include a processor-based system, such as a computer system, that can include a desktop computer, a laptop computer, a personal digital assistant, a cellular telephone, a smartphone, a set-top box, a music player, a tablet computer system, a game console, or an electronic book reader. The client device 109 can include a display 106 that can be a liquid crystal display (LCD) or light emitting diode (LED) display. The client device 109 can also be equipped with network interfaces, including a localized network interface, such as a near-field communication (NFC) interface or radio-frequency identification (RFID) interface.

The client device 109 can execute various applications, such as the client application 103. The client application 103 can access network content served up by the computing environment 203 or other servers. The client application 103 can also render a user interface 100 on the display 106. To this end, the client application 103 can include a browser or a dedicated application, and the user interface 100 can include a network page, an application screen, or other interface. The client application 103 can include a file viewer application 248 which can show file content 245 in a user interface 100. Although shown as being a component of the client application 103, in some examples, the file viewer application 248 can be a separate application. The client device 109 can execute applications beyond the client application 103 such as management applications, enterprise applications, social networking applications, word processors, spreadsheet applications, or media viewing applications.

Next, a general description of the operation of the various components of the networked environment 200 is provided. To begin, the client application 103 can be used to traverse hierarchies of folders, files 242, and other network content. As these hierarchies can often be complex, navigating file structures can be problematic on devices with small displays. Accordingly, the content management application 212 or the client application 103 can be used to provide features that facilitate performing functions tedious on client devices 109 having relatively small displays.

In one example, the content management application 212 can generate a navigation component (also referred to as a "breadcrumb") that can allow a user to quickly return to user interfaces 100 previously accessed by the user. For example, each time a user navigates to a new user interface 100, a label can be added to the navigation component for a user interface 100 previously accessed by the user. The user can then return to a previous network page or application screen by selecting a label for the previous user interface 100. In some examples, the labels in the navigation component can include folders traversed by the user. As the navigation component adds additional labels as the user traverses folders or other network content, the length of the navigation component can exceed a width or length of the display.

Accordingly, if a size of the navigation component exceeds an applicable display area for rendering on a display 106, user interface data 221 can be generated that permits a scrolling of the labels within the navigation component. For example, by performing a swipe right gesture 236, the navigation component can move labels shown therein in a right direction, thereby showing labels located to the left of a current position of the navigation component. Similarly, by performing a swipe left gesture 236, the navigation component can move labels horizontally in a left direction, thereby showing labels located to the right of its current position. In other examples, other gestures 236 or user input can be detected to scroll the navigation component. For example, a mouse drag in a left or right direction or a long press on a directional key of a keyboard can be performed to cause a scrolling of the navigation component.

In another example, the client application 103 or the content management application 212 can facilitate opening multiple files 242 concurrently in the user interface 100. In one example, a listing of network content, such as folders or files 242, can be shown when a viewer views a document in the file viewer application 248. Selection of a folder can cause sub-folders to be shown in the listing as well as files 242 stored within the folder. Selection of a file 242 can cause the file viewer application 248 to open the selected file 242.

The client application 103 can detect various types of selections of one or more of the files 242 in the user interface 100, for example, by detecting a touch input performed on a touch screen display of a client device 109. In some examples, the touch input can be made by a gesture 236 performed on a touch screen display, such as a long press, a short press, a left swipe, a right swipe, a finger swipe, or a palm swipe. In some embodiments, the gesture 236 can be performed by a finger or a portion of the hand by making contact with the surface of the touch screen display. In other examples, the gesture 236 can be performed using a stylus or suitable device.

In some examples, different types of gestures 236 performed for a file 242 can cause different functions to be performed. For example, a first type of gesture 236, such as a short press, can cause only the file 242 to be shown in the file viewer application 248, while a second type of gesture 236, such as a long press, can cause the file 242 and any active files 242 to be shown concurrently in the file viewer application 248. The content management application 212 can generate an arrangement 233 of the files 242 for display in the user interface 100. An arrangement 233 can include an orientation, size, or location of the file 242 in the user interface 100. In one example, two files 242 can be shown in a side-by-side arrangement 233, which can be referred to as a split screen or a dual view arrangement 233.

In some examples, an arrangement 233 can be determined based on the number of files 242 active in the client application 103 or a number of new files 242 to show in the display 106. The arrangement 233 of files 242 can include a matrix. For example, if four files 242 are to be shown concurrently in a user interface 100, a 2-by-2 matrix arrangement 233 can be used to show each of the files 242. Also, in this example, 25% of the viewable area dedicated for the file viewer application 248 can be provided for each of the files 242.

In some examples, one or more of the files 242 to be shown can be assigned a greater size in the user interface 100 relative to other files 242 based on a priority of the files 242. For example, files 242 having a higher priority can be shown in the user interface 100 in a size larger than files 242 having a lower priority. In some examples, priority can be determined based on the age of the file 242, the frequency of access of the file 242, whether the file 242 has been designated as a favorite file 242, and whether the file 242 has been designated as a required file 242. The user interface 100 can be modified or updated to include all or a portion of the files 242 according to an arrangement 233.

In yet another example, the client application 103 or the content management application 212 can facilitate a renaming of files 242 using cards 112 or other suitable user interface components. For example, when a rename icon 130 is manipulated in a card 112 or a dialog 127, the client application 103 can present a rename dialog 133 in the user interface 100 that allows a user to specify a name for a particular file 242. A current name for the file 242 can be shown in a text field 136 that, when manipulated, can allow a user to modify the current name using a suitable input device, such as a virtual keyboard. When a file 242 is renamed, a header or metadata of the file 242 can be updated in the computing environment 203 accordingly to reflect the change in the filename. The header, metadata, or the new filename can be communicated to the computing environment 203 to update a remotely stored version of the file 242, without having to communicate the file 242 itself. As a result, less data can be communicated over the network 206.

In yet another example, when a particular gesture 236 is performed on a card 112 for a folder, a carousel component can be shown that allows the user to navigate the contents of the folder within the selected card 112, as opposed to opening the contents of the folder in another user interface 100. The carousel component can include identifiers, such as icons or images, that represent the folders or files 242 in the folder corresponding to the selected card 112. Discussion of the carousel component will be discussed in greater detail below with respect to FIGS. 5A-5B.

Figure 3A:
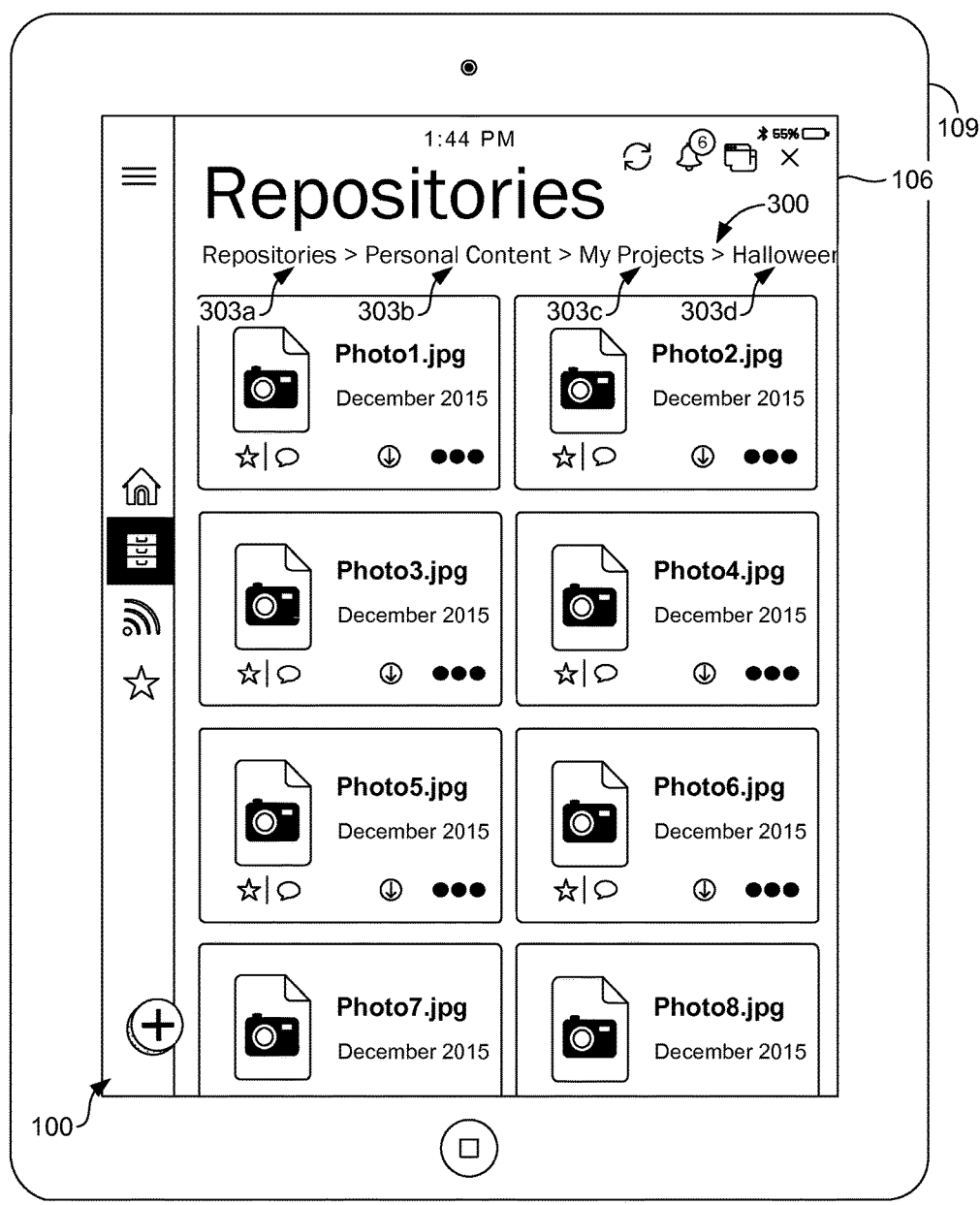
FIGS. 3A-3B are drawings of examples of user interfaces rendered on a display of a client device.

Turning now to FIG. 3A, shown is an example of a user interface 100 of a client application 103 rendered on a display 106 of a client device 109. In the example of FIG. 3A, the client application 103 generates a listing of files 242 stored in a particular folder or directory. To facilitate navigation between folders, a navigation component 300 (also referred to as a "breadcrumb") can provide labels 303a . . . 303d (collectively labels 303) that, when selected, access folders or user interfaces previously navigated by the user. For example, a user can select a label 303a for "Repositories" or a label 303b for "Personal Content" to return to a respective folder for either "Repositories" or "Personal Content."

As a user navigates the client application 103, additional labels 303 for folders or user interface screens are added to the end of the navigation component 300. However, as the navigation component 300 adds additional labels 303, the length of the navigation component 300 can exceed a width or length of the display 106, as shown in FIG. 3A. Accordingly, in some examples, the labels 303 in the navigation component 300 can be minimized by replacing a portion of the characters in the label with a symbol, such as an ellipses, or other identifier that suggests that a full label 303 has not been provided. For example, the label 303a for "Repositories" can be changed to "Repos . . . ," thereby shortening a length of the navigation component 300. This can be performed for all or a subset of the labels 303 in the navigation component 300.

In other examples, the navigation component 300 can be encoded as a dynamic feature of the user interface 100 allowing a user to interact with the navigation component 300 as a whole, as opposed to the individual labels 303. For example, by performing a swipe right gesture 236, the navigation component 300 can move the labels 303 horizontally in the user interface 100 in a right direction, showing labels 303 located to the left of a current position of the navigation component 300. Similarly, by performing a swipe left gesture 236, the navigation component 300 can move labels 303 horizontally in a left direction, showing labels 303 located to the right of its current position. In these examples, the labels 303 of the navigation component 300 do not require shortening with a symbol or other identifier.

Figure 3B:
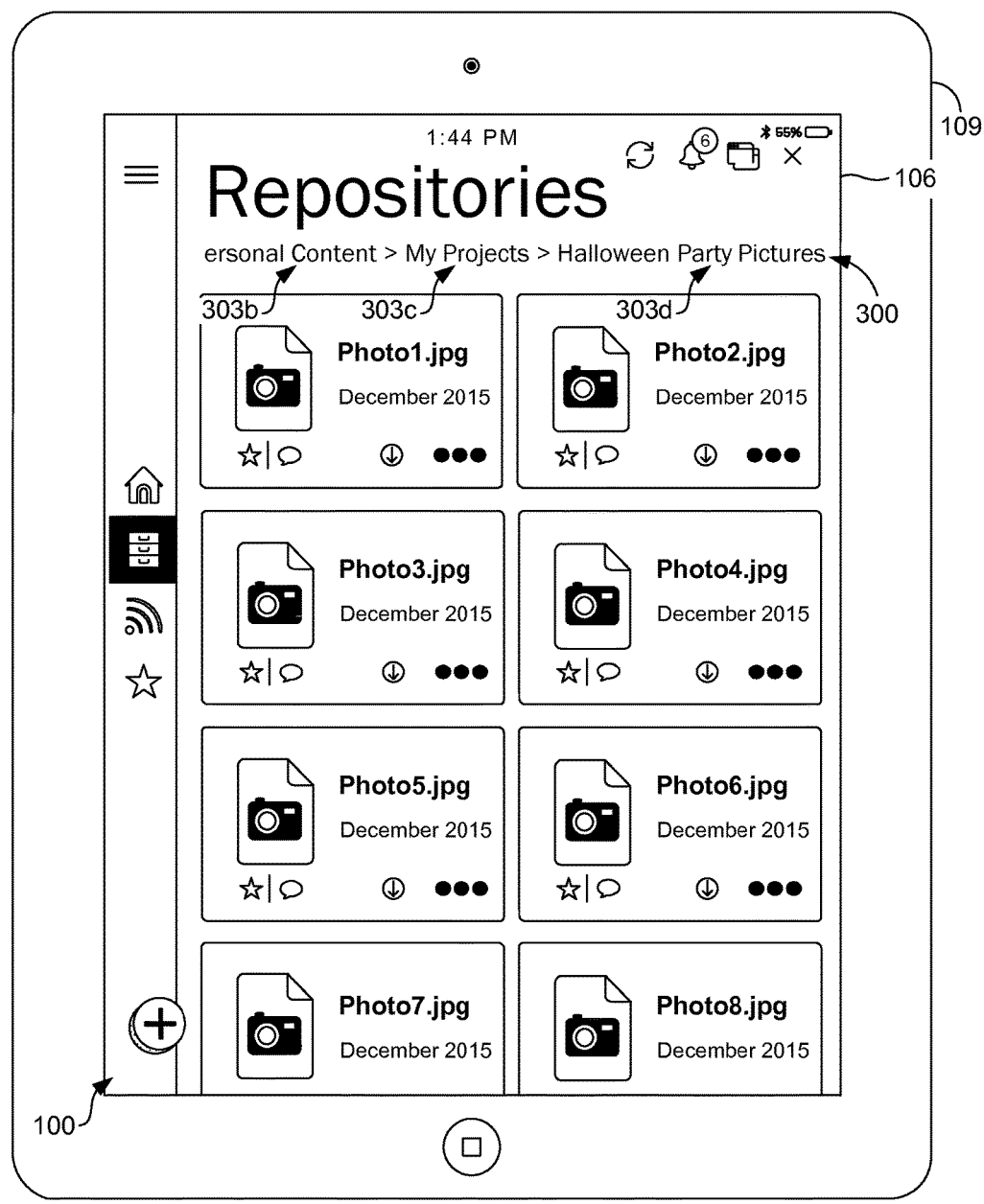

As shown in FIG. 3B, when a left swipe the navigation component 300 is performed, a right-most portion of the labels 303, such as label 303d, can be shown while the left-most portion of the labels 303, such as label 303a, are hidden from the user interface 100. For example, the right-most label 303d of "Halloween Party Pictures" is shown completely in FIG. 3B, while the left-most label 303a for "Repositories" is hidden and the label 303b for "Personal Content" is partially hidden in the user interface 100. Referring back to FIG. 3A, when a right swipe the navigation component 300 is performed, a left-most portion of the labels 303 can be shown while the right-most portion of the labels 303 are hidden from the user interface 100.

Figure 4A:
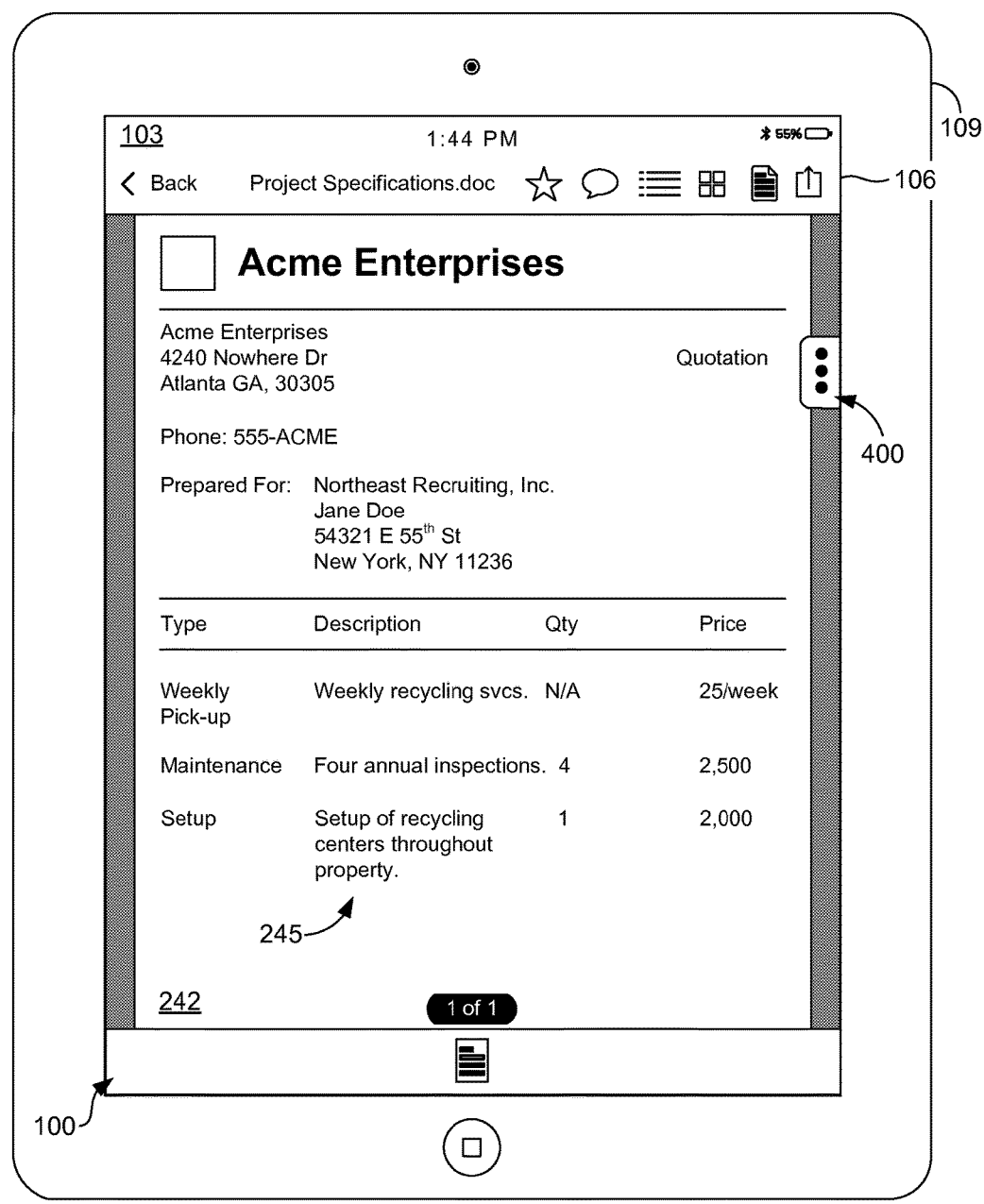
FIGS. 4A-4E are drawings of examples of user interfaces rendered on a display of a client device.

Moving on to FIG. 4A, shown is an example of a user interface 100 of a client application 103 rendered on a display 106 of a client device 109. In the example of FIG. 4A, the file content 245 for a given file 242 are shown using the client application 103. As the client device 109 can include a mobile device, such as a tablet or a smartphone, the features of the client application 103 can facilitate navigating and modifying files 242 with a touch-screen display. For example, turning between pages of a file 242 can be performed by a swipe gesture 236 in a left or a right direction. A tab component 400 of the user interface 100 can facilitate accessing files 242 or other network content.

Figure 4B:
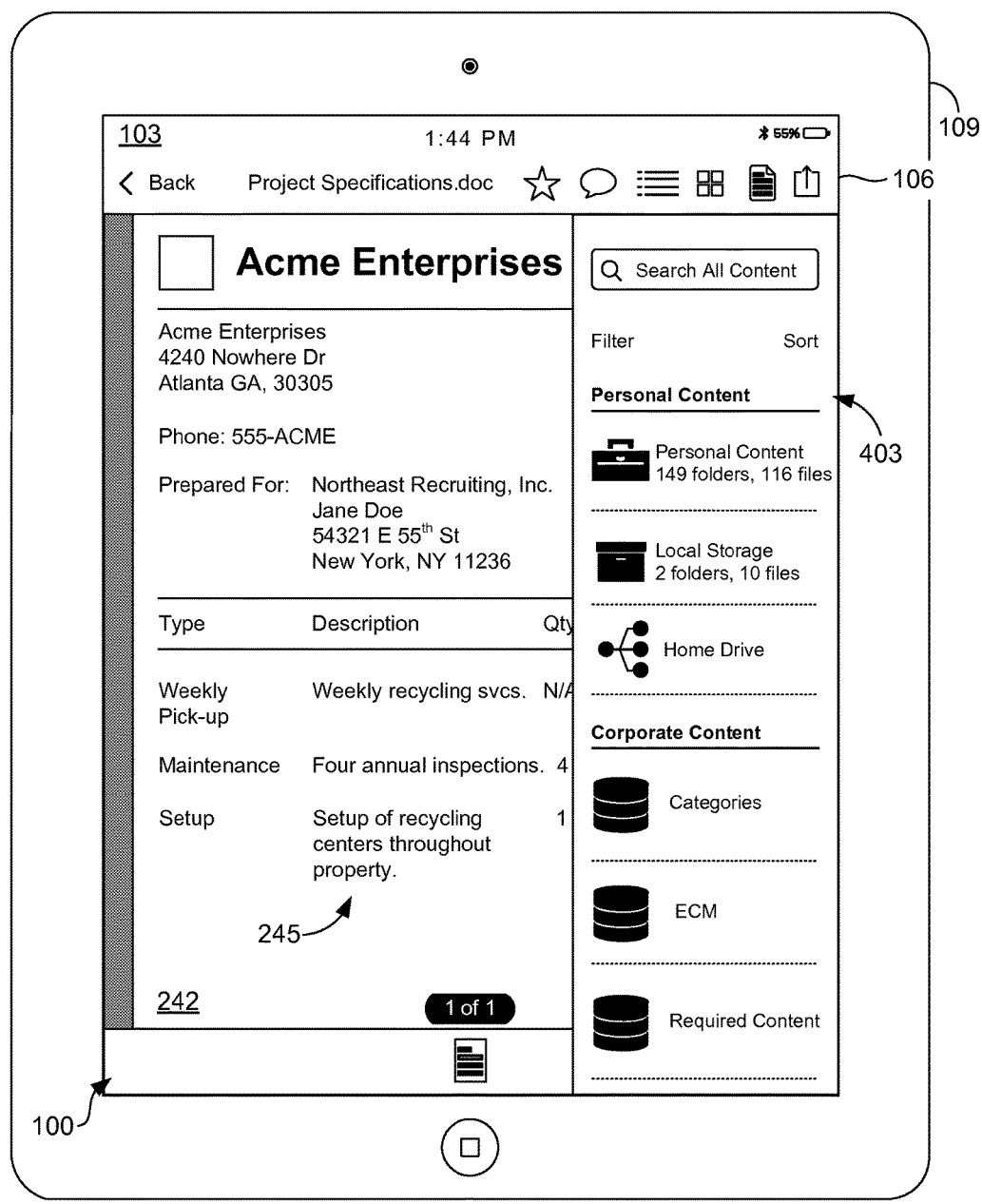

As shown in FIG. 4B, when the tab component 400 is manipulated, the client application 103 can present a navigation bar component 403 in the user interface 100 that allows users to navigate or search for files 242 or content while the user views, modifies, or otherwise manipulates the active file 242 shown in the user interface 100. The navigation bar component 403 can be "docked" or positioned at the edge of the screen or can be moved as a "floating" user interface component to various locations in the user interface 100. In some examples, the navigation bar component 403 facilitates navigating personal content or enterprise content. Personal content can include content created by a user not associated with his or her position at an enterprise. On the other hand, enterprise content can include content created by a user in association with an enterprise. For example, any content created in a location of an enterprise or created during business hours can be enterprise content. In some examples, the personal content and the enterprise content can be stored in different secure locations on the client device 109 or the computing environment 203.

The computing environment 203 can encode a listing of files 242, folders, or other content available for access on the client device 109 in the navigation bar component 403 for rendering in the display 106. The client application 103 can detect a selection of one or more of the files 242 in the user interface 100, for example, by detecting a touch input performed on a touch screen display of a client device 109.

Figure 4C:
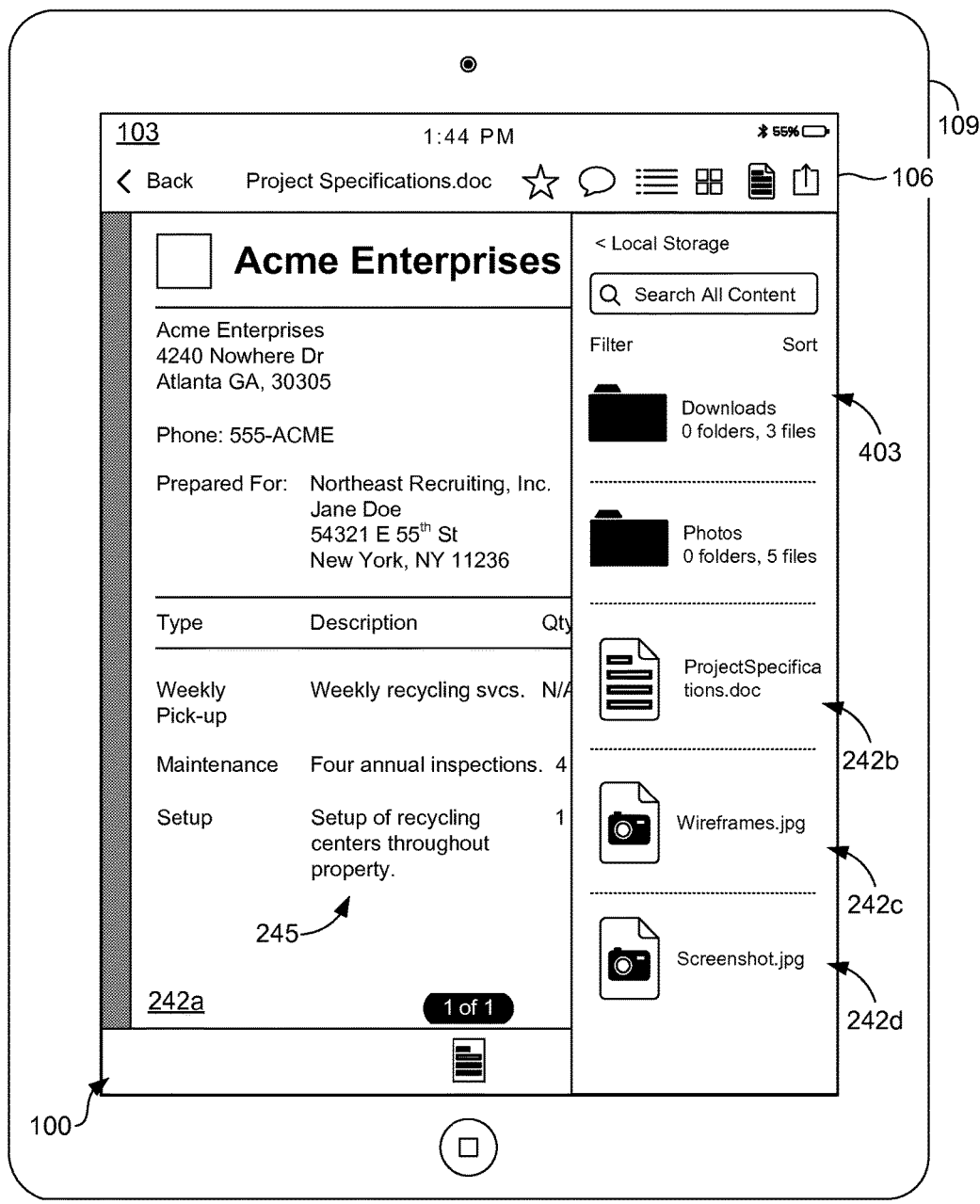

Referring next to FIG. 4C, when a folder is selected in the listing shown in the navigation bar component 403, sub-folders or files 242b . . . 242d stored in the folder can be shown. To this end, a user can dial down folders or other hierarchies of content to access particular files 242. Further, the client application 103 can recognize different gestures 236 performed in association with one or more of the files 242 in the listing. For example, a touch input recognized by the client application 103 can include a long press, a short press, a left swipe, a right swipe, a finger swipe, or a palm swipe. A developer of the client application 103 or an administrator can predefine certain gestures 236 that, when performed, cause various functions to be performed. In one example, a long press on a file 242 can cause multiple files 242 to be shown in the user interface 100 while a short press on a file 242 can cause only the selected file 242 to be shown in the user interface 100.

If the client application 103 has a file 242a active in the user interface 100, the user interface 100 can be modified to include both the active file 242a and a file 242 selected by the user, such as the file 242 selected using the long press gesture 236. In the example of FIG. 4C, the user interface 100 can be modified to include both the active file 242a, such as the document labeled "Acme Enterprises," and one of the files 242b . . . 242d selected by the user, such as the documents labeled "ProjectSpecifications.doc," "Wireframes.jpg," and "Screenshot.jpg."

Figure 4D:
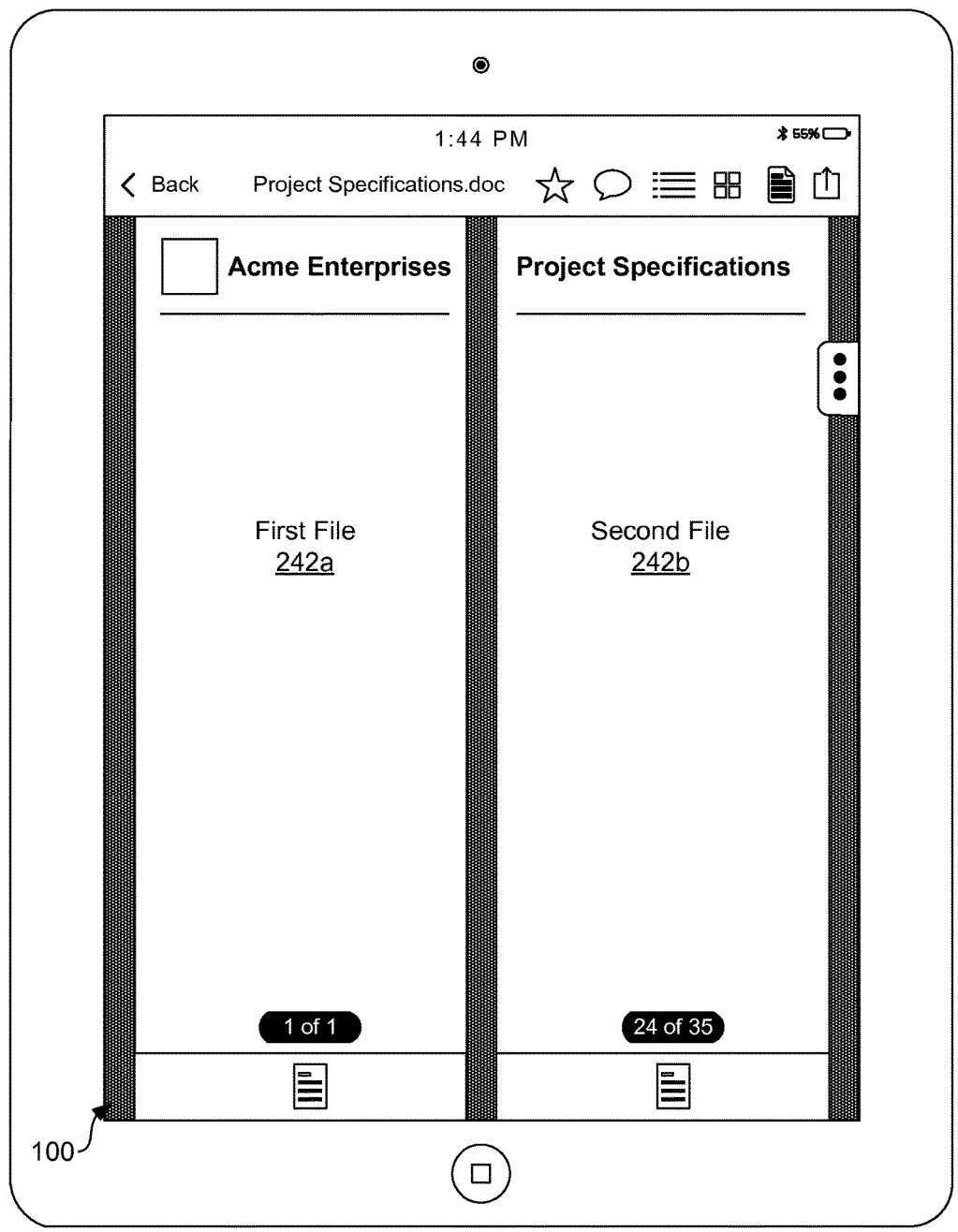

Referring next to FIG. 4D, shown is an arrangement 233 of the files 242 for display in the modified user interface 100. In FIG. 4D, a first file 242a is shown in a side-by-side arrangement 233 (also referred to as a split screen or a dual view arrangement 233) with a second file 242b. In some examples, the arrangement 233, as well as the size of the files 242 in the arrangement 233, can be determined based on a number of files 242 active in the client application 103 or a number of files 242 to show in the display 106. For example, in FIG. 4C, a single file 242a is active. As a file 242 was selected to be shown in the display with another file 242, a number, such as the number two, can be derived to create the side-by-side arrangement 233, where 50% of the viewable area can be provided for the first file 242a and 50% of the viewable area can be provided for the second file 242b. When multiple files 242 are shown in the user interface 100, the client application 103 can facilitate independent manipulation of each of the files 242. For example, the first file 242a can be browsed, edited, enlarged, minimized, or zoomed while a state of the second file 242b in the user interface 100 remains unchanged.

Figure 4E:
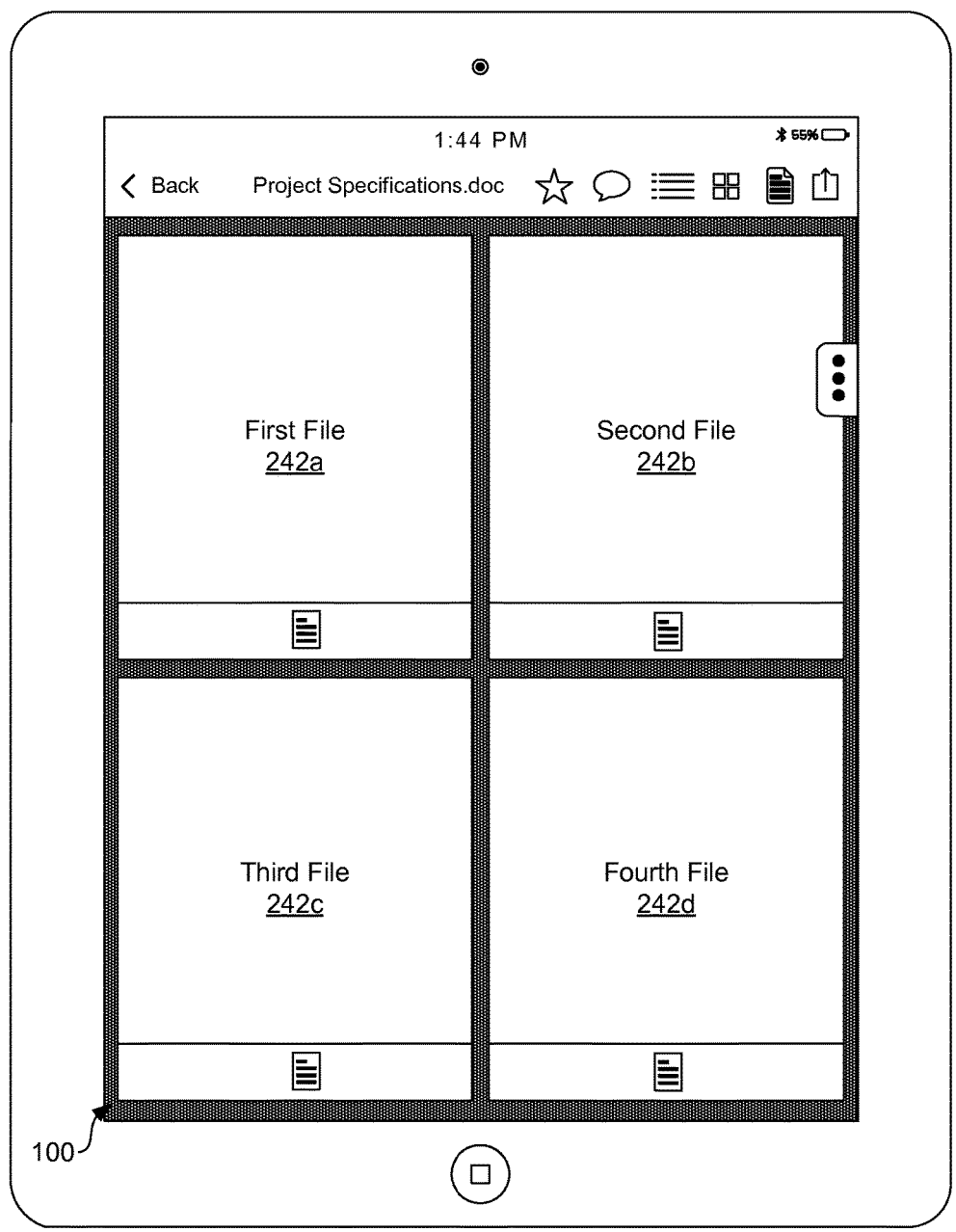

Moving on to FIG. 4E, shown is an example of a user interface 100 of a client application 103 rendered on a display 106 of a client device 109. In the example of FIG. 4E, a first file 242a, second file 242b, third file 242c, fourth file 242d are shown in an arrangement 233 in the user interface 100. In some examples, the arrangement 233, as well as the size of the files 242 in the arrangement 233, can be determined based on a number of files 242 active in the client application 103 and/or a number of files 242 to show in the display 106. As FIG. 4E shows four active files 242, a number (e.g., four) can be derived to create the 2-by-2 matrix arrangement 233, where 25% of the viewable area can be provided for each of the files 242. In some examples, the size of each of the files 242 can be calculated as:

$$Size_{File_n} = \frac{1}{Count(Files)} \times 100\%, \quad (eq. 1)$$

where $Size_{File_n}$ is the size of file 242 n, and Count(Files) is the number of files 242 to be shown concurrently in the user interface 100.

In other embodiments, some of the files 242 can be assigned a greater size in the user interface 100 relative to other files 242 based on a priority of the files 242. For example, files 242 having a higher priority can be shown in the user interface 100 having a size larger than files 242 having a lower priority. In some examples, priority can be determined based on the age of the file 242, the frequency of access, whether the file 242 has been designated as a favorite file 242 or whether the file 242 has been designated as a required file 242. The client application 103 can facilitate the independent manipulation of each of the files 242 in the user interface 100. For example, the first file 242a can be browsed, edited, enlarged, minimized, or zoomed while a state of the second file 242b, the third file 242c, and the fourth file 242d remain unaltered.

Figure 5A:
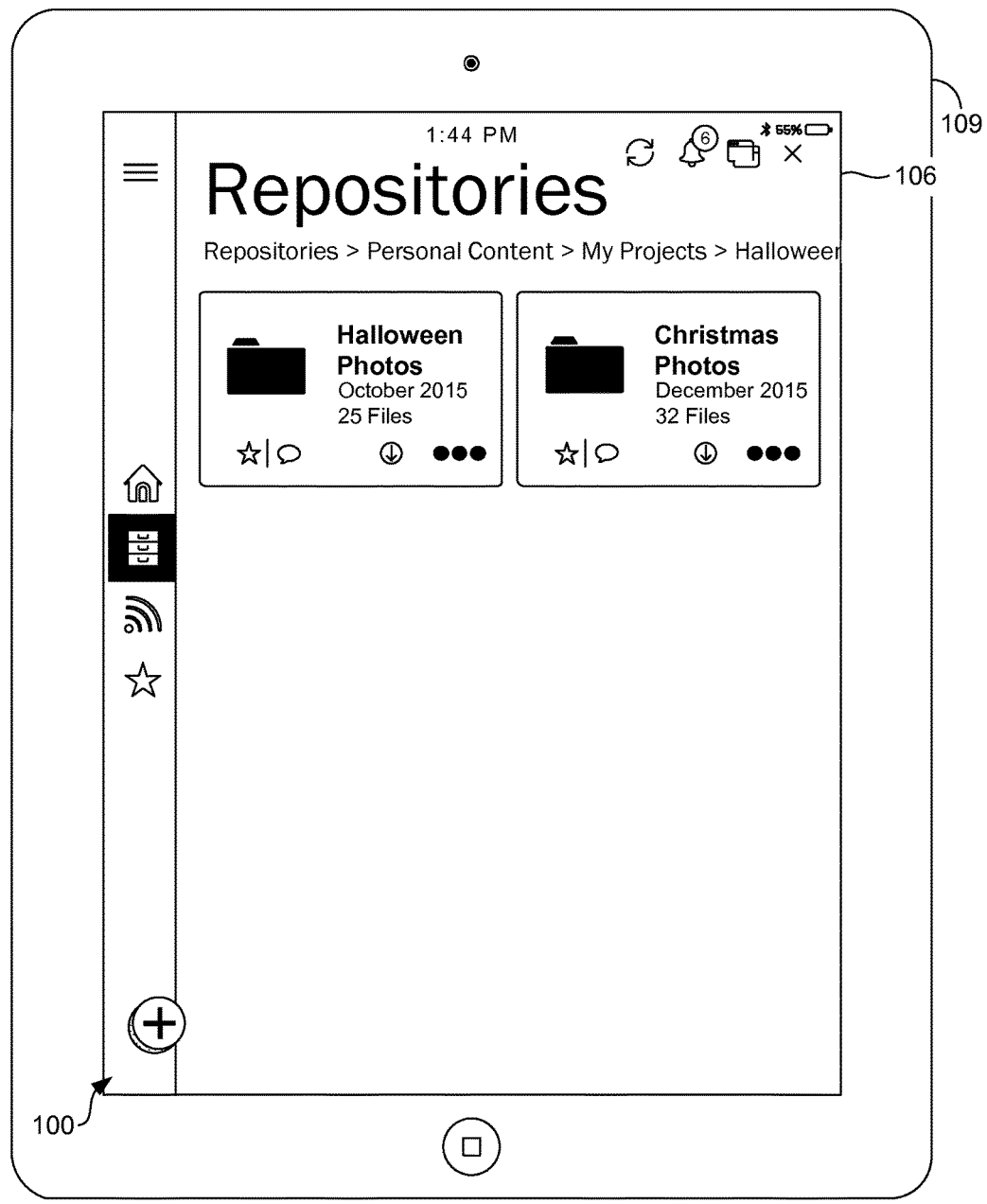
FIGS. 5A-5B are drawings of examples of user interfaces rendered on a display of a client device.

Turning now to FIG. 5A, shown is an example of a user interface 100 of a client application 103 rendered on a display 106 of a client device 109. In the example of FIG. 5A, cards 112 are shown for folders, which can represent folders of a network drive or folders stored on the client device 109. In one example, when a card 112 for a folder is selected or otherwise manipulated, one or more user interfaces 100 can be rendered to show the contents of the folder.

Figure 5B:
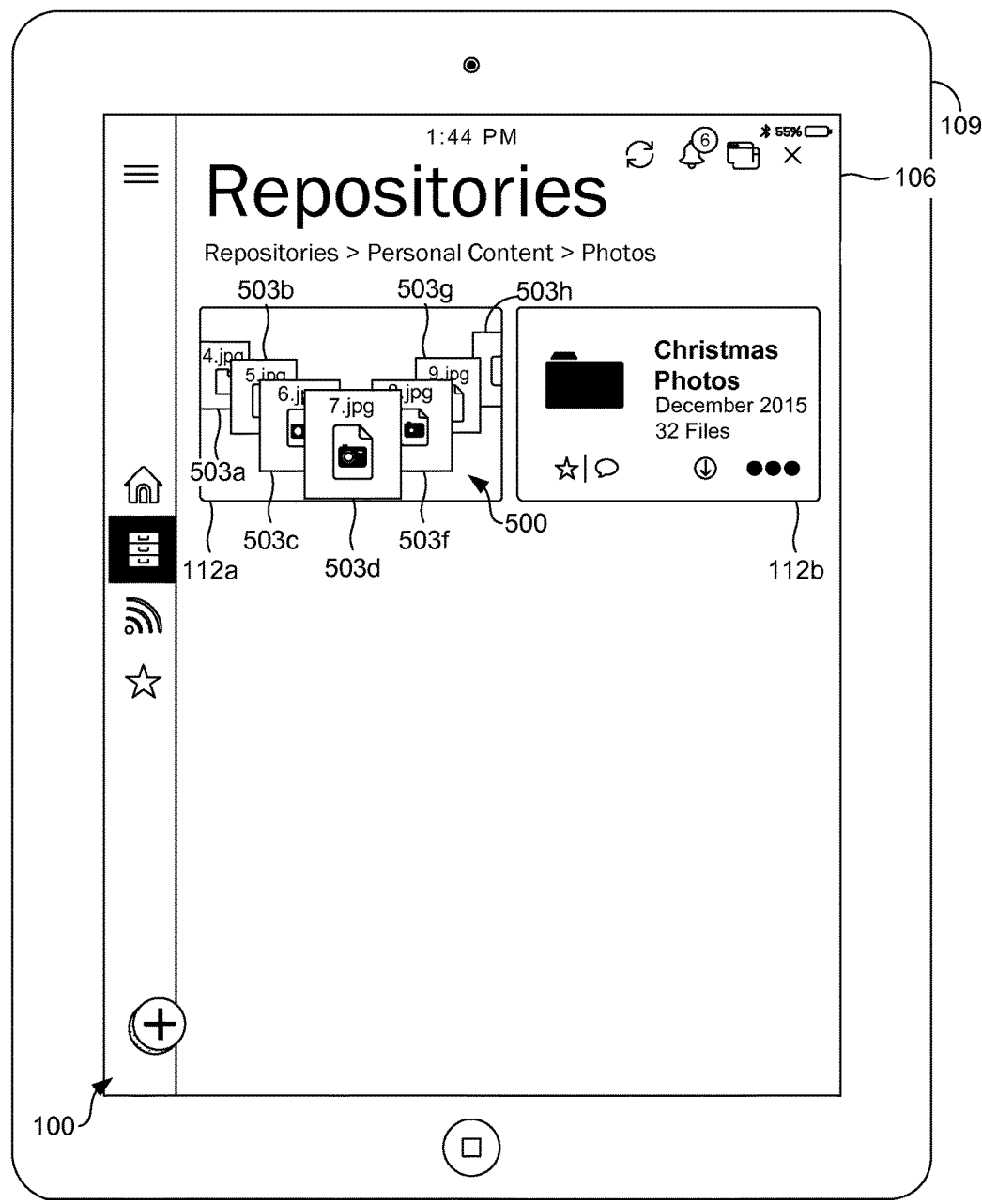

In another example, when a card 112 for a folder is selected or otherwise manipulated, a carousel component 500 can be shown that allows the user to navigate the contents of the folder directly in the selected card 112, as shown in FIG. 5B. The carousel component 500 can include identifiers 506a . . . 506h (collectively identifiers 506), such as icons or images, that represent each of the files 242 in the folder corresponding to the card 112.

The carousel component 500 can be encoded as a dynamic feature of the user interface 100 allowing a user to interact with the according component 500 as well as the individual identifiers 506. For example, by performing a swipe right gesture 236, the carousel component 500 can move the identifiers 506 horizontally in the user interface 100 in a right direction, showing identifiers 506 located to the left of a current position of the navigation component 300. Identifiers 506 located proximate to a center of the card 112 can be shown in a larger size while identifiers 506 located away from the center can be shown in a smaller size. Hence, the identifiers 506 located in the center of the card 112 are more apparent to the user. Similarly, by performing a swipe left gesture 236, the carousel component 500 can move identifiers 503 horizontally in a left direction, showing identifiers 506 located to the right of its current position. In some examples, the identifiers 506 can include an icon or an image representing a type of the file 242, such as portable document format (PDF), document file format (DOC), rich text format (RTF), PowerPoint® format (PPT), or Excel® format (XLS).

Figure 6:
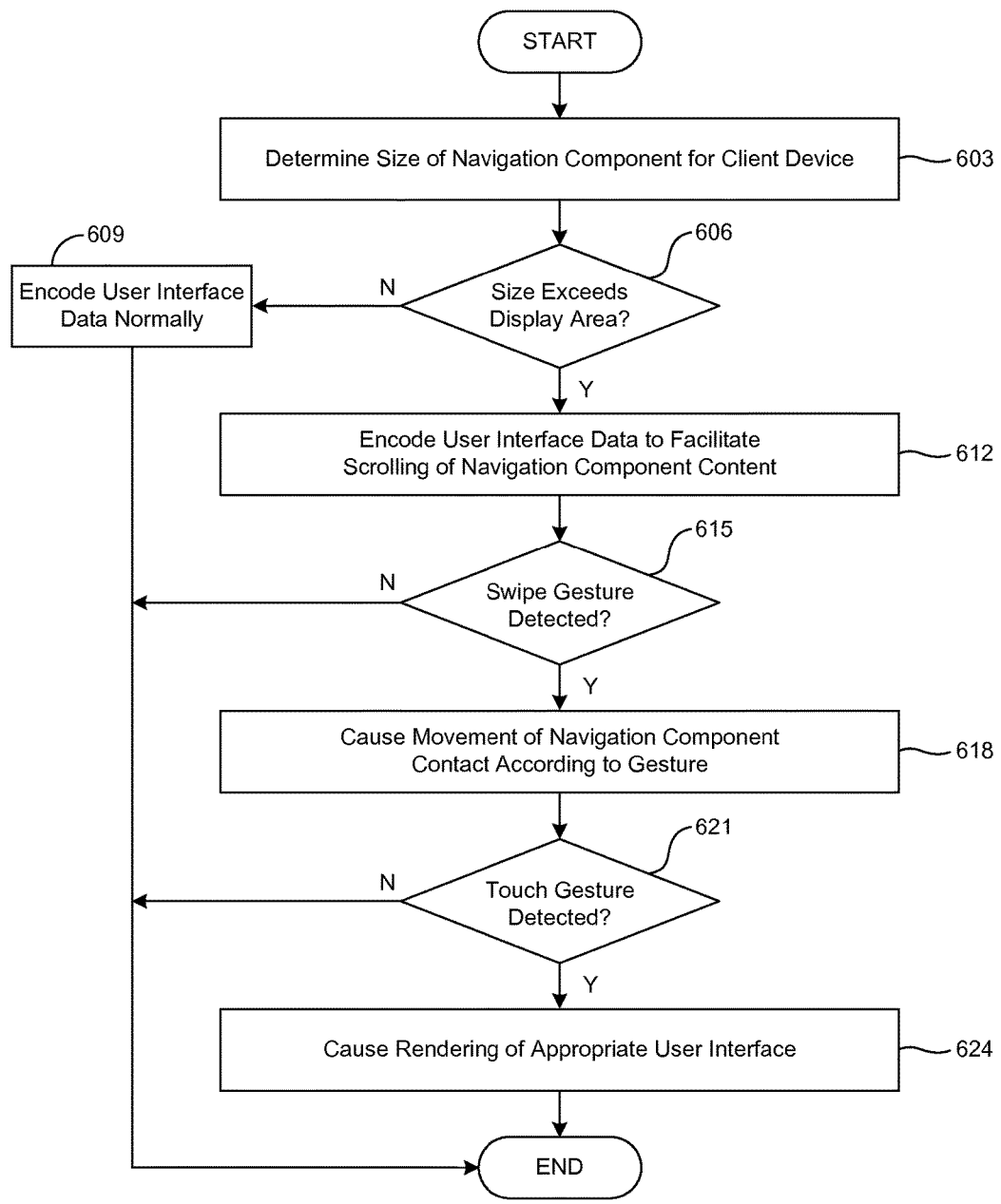
FIG. 6 is a flowchart illustrating an example of functionality implemented by components that can be executed in the networked environment of FIG. 2.

Referring next to FIG. 6, shown is a flowchart that provides one example of the operation of a portion of the networked environment 200. As an alternative, the flowchart of FIG. 6 can be viewed as depicting an example of steps of a method implemented by the content management application 212 or the client application 103. The separation or segmentation of functionality as discussed herein is presented for illustrative purposes only.

As the client application 103 can be used to traverse often complex hierarchies of folders, files 242, and other content, the client application 103 can provide a navigation component 300 that facilitates quickly returning to a user interface, such as a network page or user interface screen, previously accessed by a user. For example, in FIG. 3A, a user can select a label 303a for "Repositories" or a label 303b for "Personal Content" to return to a respective folder for either "Repositories" or "Personal Content." In some examples, the labels 303 include user interface components, such as buttons or hyperlinks.

As a user navigates the client application 103, additional labels 303 for folders or user interface screens can be added to the end of the navigation component 300. However, as the navigation component 300 adds additional labels 303, the length of the navigation component 300 can exceed a width or length of the display 106, for example, when the user has traversed many folders.

Accordingly, starting with step 603, a size of a navigation component 300 can be determined based on, for example, the labels 303 to be included in the navigation component 300. The size can include, for example, an amount of pixels (or other unit of measurement) the navigation component 300 would span if shown in a display without modification. In step 606, a determination can be made whether the size of the navigation component 300 exceeds an applicable display area for rendering on a display 106. For example, a size of a navigation component 300 having many labels 303 can exceed an applicable display area, where an end of the navigation component 300 would not be visible to a user.

As some client devices 109 present a user interface 100 in a portrait mode when the client device 109 is held or placed in a first orientation, such as vertically, and a landscape mode when the client device 109 is held or placed in a second orientation, such as horizontally, in some examples, the size of the navigation component 300 can be determined for a portrait mode of the display 106 or a landscape mode of the display 106. This can include determining whether the size calculated in step 603 exceeds a width or a length of a display 106 for a particular type of client device 109.

If the size of the navigation component 300 does not exceed an applicable display area, then in step 609 user interface data can be encoded normally to present the navigation component 300 in a user interface 100. For example, the labels 303 can be encoded in the navigation component 300 without modifying the labels 303 or the size of the navigation component 300. However, if the size exceeds the applicable display area, then in step 612, the user interface data can be encoded to facilitate scrolling of the navigation component 300. For example, by performing a swipe right gesture 236, the navigation component 300 can move the labels 303 horizontally in the user interface 100 in a right direction, thereby showing labels 303 located to the left of a current position of the navigation component 300. Similarly, by performing a swipe left gesture 236, the navigation component 300 can move labels 303 horizontally in a left direction, thereby showing labels 303 located to the right of its current position.

Accordingly, in step 615, a determination can be made whether a swipe gesture 236, such as a left swipe or a right swipe, has been detected on the display 106. Although described as a swipe gesture 236, other gestures 236 or user input can be detected to horizontally scroll the navigation component 300. For example, a mouse drag or a long press on a directional key of a keyboard can be performed to cause a scrolling of the navigation component 300.

If a swipe gesture 236 is not detected, the process can terminate or await performance of a gesture 236. If a swipe gesture 236 is detected, in step 618 the navigation component 300 can be moved according to the gesture 236 detected in step 615. In some examples, this can include determining a direction or speed of the swipe gesture 236 and moving the contents of the navigation component 300 in a corresponding direction at a rate proportional to the speed of the swipe gesture 236.

Although the labels 303 are in a dynamic component movable in the user interface 100, the labels 303 can be selected or otherwise manipulated by the user to access a user interface corresponding to the selected label 303. Hence, in step 621, it can be determined whether a touch gesture 236, such as a short press or a long press, has occurred in a region associated with a label 303 of the navigation component 300. If a touch gesture 236 is not detected, the process can terminate or await performance of a touch gesture 236. If a touch gesture 236 is detected, in step 624, a user interface corresponding to the label selected using the touch gesture 236 can be rendered in the display 106.

Figure 7:
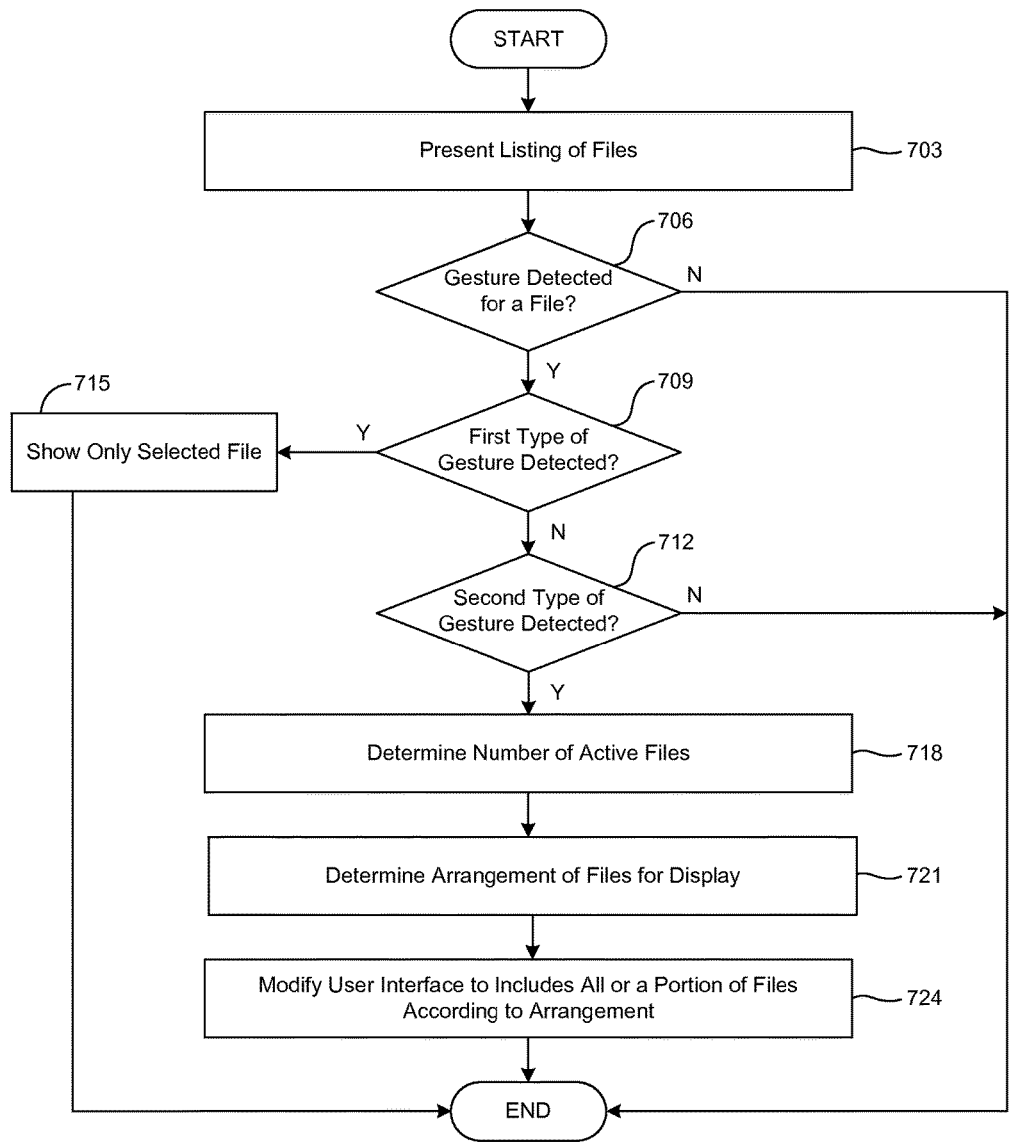
FIG. 7 is a flowchart illustrating an example of functionality implemented by components that can be executed in the networked environment of FIG. 2.

Referring next to FIG. 7, shown is a flowchart that provides one example of the operation of a portion of the computing environment 203. As an alternative, the flowchart of FIG. 6 can be viewed as depicting an example of elements of a method implemented by the content management application 212 or the client application 103 according to one or more embodiments. The separation or segmentation of functionality as discussed herein is presented for illustrative purposes only.

As the client device 109 can include a mobile device, such as a tablet or a smartphone, the features of the client application 103 can facilitate navigating and modifying files 242 with a touch-screen display. To this end, starting with step 703, the client application 103 can present a listing of files 242 and/or folders in a touch-screen display to allow selection of individual ones of the files 242 or folders. Selection of a folder can cause sub-folders to be shown in the listing as well as files 242 stored within the folder. Selection of a file 242 can cause a rendering of the file 242 in the display 106. In some examples, the client application 103 can present a listing of files 242 in a navigation bar component 403 that allows users to navigate or search for files 242 or content while the user views, modifies, or otherwise manipulates an active file shown in the user interface 100. The listing of files 242 can include files 242 for personal content or enterprise content whether stored locally on the client device 109 or the computing environment 203.

The client application 103 can detect various types of selections of one or more of the files 242 in the user interface 100, for example, by detecting a touch input performed on a touch screen display of a client device 109. Accordingly, in step 706, a determination can be made whether a gesture 236 has been detected for a file 242 shown in the user interface 100. In some examples, the touch input can be made by a gesture 236 performed on the touch screen display, such as a long press, a short press, a left swipe, a right swipe, a finger swipe, or a palm swipe. In some embodiments, the gesture 236 can be performed by a finger or a portion of the hand by making contact with the surface of the touch screen display. In other examples, the gesture 236 can be performed using a stylus.

In some examples, different types of gestures 236 performed for a file 242 can perform different functions. For example, a first type of gesture 236, such as a short press, can cause only the file 242 to be shown in the user interface 100, while a second type of gesture 236, such as a long press, can cause the file 242 and any active files 242 to be shown concurrently in the user interface 100.

If a gesture 236 is not detected, the process can terminate or await performance of a gesture 236. If a gesture 236 is detected, a determination can be made whether the gesture 236 performed was a first type of gesture 236 (step 709) or a second type of gesture 236 (step 712). The first type of gesture 236 can cause only the file 242 to be shown in the user interface 100. Thus, if the first type of gesture 236 is detected, the process can proceed to step 715 to show only the selected file 242. If the first type of gesture 236 is not detected, in step 712, a determination can be made whether the gesture 236 is a second type of gesture 236. If a first type of gesture 236 and a second type of gesture 236 are not detected, the process can terminate or await potential gestures 236.

If the second type of gesture 236, such as a long press, is detected, the process can proceed to 718 to determine a number of active or open files 242. In some examples, active files 242 include files 242 being shown in the user interface 100 at the moment an additional file 242 was selected in the listing. For example, in FIG. 4C, the file 242 with the heading "Acme Enterprises" can be referred to as the active file 242 while the files 242 in the listing include "ProjectSpecifications.doc," "Wireframes.jpg," and "Screenshot.jpg."

Next, in step 721, an arrangement 233 of the files 242 for display in the user interface 100 can be determined. An arrangement 233 can include an orientation, size, or location of the file 242 in the user interface 100. In one example, two files 242 can be shown in a side-by-side arrangement 233 (also referred to as a split screen or a dual view arrangement 233). The arrangement 233 can be determined based on the number of files 242 active in the client application 103 determined in step 718. Additionally, the arrangement 233 can be determined based on a number of new files 242 to show in the display 106. The arrangement 233 of files 242 can include a matrix. For example, if four files 242 are to be shown concurrently in a user interface 100, a 2-by-2 matrix arrangement 233 can be used to show each of the files 242. Also, in this example, 25% of the viewable area can be provided for each of the files 242.

In some examples, one or more of the files 242 to be shown can be assigned a greater size in the user interface 100 relative to other files 242 based on a priority of the files 242. For example, files 242 having a higher priority can be shown in the user interface 100 in a size larger than files 242 having a lower priority. In some examples, priority can be determined based on the age of the file 242, the frequency of access of the file 242, whether the file 242 has been designated as a favorite file 242, whether the file 242 has been designated as a required file 242, and other factors. In step 724, the user interface 100 can be modified or updated to include all or a portion of the files 242. The user interface 100 can be modified or updated according to the arrangement 233 determined in step 721.

The flowcharts of FIGS. 6 and 7 show examples of the functionality and operation of implementations of components described herein. The components of the networked environment 200 described herein can be embodied in hardware, software, or a combination of hardware and software. If embodied in software, each step in the flowcharts of FIGS. 6 and 7 can represent a module or a portion of code that comprises computer instructions to implement the specified logical functions. The computer instructions can be embodied in the form of source code that comprises human-readable statements written in a programming language or machine code that comprises machine instructions recognizable by a suitable execution system, such as a processor in a computer system or other system. If embodied in hardware, each step can represent a circuit or a number of interconnected circuits that implement the specified logical functions.

Although the flowcharts show a specific order of execution, it is understood that the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid. All such variations are within the scope of the present disclosure.

The computing environment 203, client device 206, and other components described herein can each include at least one processing circuit. Such a processing circuit can comprise one or more processors and one or more storage devices that are coupled to a local interface. The local interface can comprise a data bus with an accompanying address/control bus.

A storage device for a processing circuit can store data and components that are executable by the one or more processors of the processing circuit. In some examples, the content management application 212 and the gesture recognition application 215 can be stored in one or more storage devices and be executable by one or more processors. Also, the data store 209 can be located in the one or more storage devices.

The content management application 212, the gesture recognition application 215, and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, one or more microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software or computer instructions for use by or in connection with the instruction execution system.

A computer-readable medium can include a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A non-transitory computer-readable medium embodying a program executable in at least one computing device comprising at least one hardware processor, the program, when executed by the at least one computing device, being configured to cause the at least one computing device to:
cause active ones of a plurality of files to be shown on a touch screen display of a client device, wherein the active ones of the files are shown in a first region of a user interface of a client application in association with a toggle component;
in an instance in which the toggle component is manipulated, cause a listing of the files to be shown in a second region of the user interface concurrently with the active one of the files shown in the first region;
receive a communication from the client device indicating that a touch input designating a selected one of the files was made on the client device from the second region, wherein the touch input is made by a gesture performed on the touch screen display;
identify a type of the gesture performed on the touch screen display, the type of the gesture being a long press gesture or a short press gesture, the long press gesture or the short press gesture being identified based at least in part on an amount of time the gesture was performed;
in response to the type of the gesture being a long press gesture:
identify the active ones of the files in the first region of the user interface;
generate a spatial arrangement for a subset of the files that comprises the active ones of the files and the selected one of the files, wherein the spatial arrangement comprises a size and a position for individual ones of the files in the subset, wherein the size is determined as a function of a priority determined for the files in the subset using at least one of: a file age, a frequency of access, a favorite file designation, or a required file designation; and
cause the user interface to show the files in the subset simultaneously in the first region of the user interface in accordance with the spatial arrangement; and in response to the type of the gesture being the short press gesture:
identify the selected one of the files; and
cause the user interface to show only the selected one of the files in the first region of the user interface.

2. The non-transitory computer-readable medium of claim 1, wherein the program, when executed by the at least one computing device, is further configured to cause the at least one computing device to:
determine a number of the files in the subset to be presented in the first region of the user interface; and
wherein the spatial arrangement is generated based at least in part on the number of the files in the subset to be presented in the first region of the user interface.

3. The non-transitory computer-readable medium of claim 2, wherein the arrangement is a side-by-side arrangement.

4. The non-transitory computer-readable medium of claim 1, wherein the listing of the files is presented in a navigation bar component shown in the second region, the navigation bar component being accessible when at least one of the files is active in the client application.

5. The non-transitory computer-readable medium of claim 1, wherein the individual ones of the files in the subset included in the user interface as modified are capable of independent manipulation.

6. The non-transitory computer-readable medium of claim 1, wherein the type of the gesture is identified by a remote gesture recognition application based at least in part on gesture data collected by the client device and transmitted to the at least one computing device over a network.

7. The non-transitory computer-readable medium of claim 1, wherein the second region of the user interface comprising the listing of the files, when expanded, overlaps at least a portion of the first region of the user interface comprising the files in the subset.

8. A computer-implemented method, comprising:
causing active ones of a plurality of files to be shown on a touch screen display of a client device, wherein the active ones of the files are shown in a first region of a user interface of a client application in association with a toggle component;
in an instance in which the toggle component is manipulated, causing a listing of the files to be shown in a second region of the user interface concurrently with the active one of the files shown in the first region;
receiving a communication from the client device indicating that a touch input designating a selected one of the files was made on the client device from the second region, wherein the touch input is made by a gesture performed on the touch screen display;
identifying a type of the gesture performed on the touch screen display, the type of the gesture being a long press gesture or a short press gesture, the long press gesture or the short press gesture being identified based at least in part on an amount of time the gesture was performed;
in response to the type of the gesture being a long press gesture:
identifying the active ones of the files in the first region of the user interface;
generating a spatial arrangement for a subset of the files that comprises the active ones of the files and the selected one of the files, wherein the spatial arrangement comprises a size and a position for the files in the subset, the size being determined as a function of a priority determined for the files in the subset using at least one of: a file age, a frequency of access, a favorite file designation, or a required file designation; and causing the user interface to show the files in the subset simultaneously in the first region of the user interface in accordance with the spatial arrangement; and in response to the type of the gesture being the short press gesture:

identifying the selected one of the files; and causing the user interface to show only the selected one of the files in the first region of the user interface.

9. The computer-implemented method of claim 8, further comprising:

determining a number of the files in the subset to be presented in the first region of the user interface; and wherein the spatial arrangement is generated based at least in part on the number of the files in the subset to be presented in the first region of the user interface.

10. The computer-implemented method of claim 9, wherein the arrangement is a matrix arrangement.

11. The computer-implemented method of claim 8, wherein the listing of the files is presented in a navigation bar component accessible when at least one of the files is active in the client application.

12. The computer-implemented method of claim 8, wherein the files in the subset included in the first region of the user interface as modified are capable of independent manipulation.

13. The computer-implemented method of claim 8, wherein the type of the gesture is identified by a remote gesture recognition application based at least in part on gesture data collected by the client device and transmitted to the at least one computing device over a network.

14. The computer-implemented method of claim 8, wherein the second region of the user interface comprising the listing of the files, when expanded, overlaps at least a portion of the first region of the user interface comprising the files in the subset.

15. A system, comprising:

at least one computing device;

program code stored in memory that, when executed by the at least one computing device, causes the at least one computing device to:

cause active ones of a plurality of files to be shown on a touch screen display of a client device, wherein the active ones of the files are shown in a first region of a user interface of a client application in association with a toggle component;

in an instance in which the toggle component is manipulated, cause a listing of the files to be shown in a second region of the user interface concurrently with the active one of the files shown in the first region;

receive a communication from the client device indicating that a touch input designating a selected one of the files was made on the client device from the second region, wherein the touch input is made by a gesture performed on the touch screen display;

identify a type of the gesture performed on the touch screen display, the type of the gesture being a long press gesture or a short press gesture, the long press gesture or the short press gesture being identified based at least in part on an amount of time the gesture was performed;

in response to the type of the gesture being a long press gesture:

identify the active ones of the files in the first region of the user interface;

generate a spatial arrangement for a subset of the files that comprises the active ones of the files and the selected one of the files, wherein the spatial arrangement comprises a size and a position for individual ones of the files in the subset, the size being determined as a function of a priority determined for of the files in the subset using at least one of: a file age, a frequency of access, a favorite file designation, or a required file designation; and cause the user interface to show the files in the subset simultaneously in the first region of the user interface in accordance with the spatial arrangement; and in response to the type of the gesture being the short press gesture:

identify the selected one of the files; and cause the user interface to show only the selected one of the files in the first region of the user interface.

16. The system of claim 15, further comprising program code that, when executed by the at least one computing device, causes the at least one computing device to:

determine a number of the files in the subset to be presented in the first region of the user interface; and wherein the spatial arrangement is generated based at least in part on the number of the files in the subset to be presented in the first region of the user interface.

17. The system of claim 15, wherein the listing of the files is presented in a navigation bar component accessible when at least one of the files is shown in the first region of the user interface.

18. The system of claim 15, wherein the files in the subset included in the first region of the user interface as modified are capable of independent manipulation.

19. The system of claim 15, wherein the type of the gesture is identified by a remote gesture recognition application based at least in part on gesture data collected by the client device and transmitted to the at least one computing device over a network.

20. The system of claim 15, wherein the second region of the user interface comprising the listing of the files, when expanded, overlaps at least a portion of the first region of the user interface comprising the files in the subset.

* * * * *